United States Patent [19]

Riemer et al.

[11] Patent Number: 4,629,388
[45] Date of Patent: Dec. 16, 1986

[54] TOWING AID FOR VEHICLES

[75] Inventors: Bernd Riemer; Herbert Mehren, both of Stuttgart, Fed. Rep. of Germany

[73] Assignee: Daimler-Benz Aktiengesellschaft, Stuttgart, Fed. Rep. of Germany

[21] Appl. No.: 699,270

[22] Filed: Feb. 7, 1985

[51] Int. Cl.$^4$ .............................................. B60P 3/12
[52] U.S. Cl. ............................ 414/427; 280/47.13 R; 280/47.15
[58] Field of Search ...................... 414/426, 427, 428; 280/47.13 R, 47.15, 767; 254/2 R, 2 B

[56] References Cited

U.S. PATENT DOCUMENTS

| | | | |
|---|---|---|---|
| 1,188,033 | 6/1916 | Bihler | 280/47.15 |
| 1,650,031 | 11/1927 | Nash | 280/47.15 X |
| 1,681,665 | 8/1928 | Haynes | 280/47.15 |
| 2,550,219 | 4/1951 | Bollinger | 280/47.13 X |
| 2,943,863 | 7/1960 | Corey et al. | 280/47.13 R |
| 3,198,538 | 8/1965 | Nowell | 414/427 X |
| 3,273,857 | 9/1966 | Branick | 254/2 R |
| 3,830,387 | 8/1974 | Virnig | 414/427 |
| 4,022,341 | 5/1977 | Lindquist | 414/426 |
| 4,571,142 | 2/1986 | Niewald et al. | 414/427 |

FOREIGN PATENT DOCUMENTS

| | | |
|---|---|---|
| 2841215 | 4/1980 | Fed. Rep. of Germany . |
| 2923183 | 12/1980 | Fed. Rep. of Germany . |
| 3133465 | 3/1983 | Fed. Rep. of Germany . |
| 3331342 | 3/1985 | Fed. Rep. of Germany . |

Primary Examiner—Leslie J. Paperner
Assistant Examiner—Stuart J. Millman
Attorney, Agent, or Firm—Barnes & Thornburg

[57] ABSTRACT

A towing apparatus for a rail bound vehicle is described. The towing apparatus includes both a lifting device for lifting the wheel load off of a defective wheel, tire or axle and a mobile support which supports the load, normally supported by the defective wheel, during a towing operation. The lifting device occupies a minimum of space and is supported by the road surface rather than by the rail. The mobile support may be conveniently and positively engaged with a defective wheel hub under conditions wherein a minimum of maneuvering space is available.

13 Claims, 3 Drawing Figures

TOWING AID FOR VEHICLES

BACKGROUND AND SUMMARY OF THE INVENTION

The invention relates generally to a towing apparatus for vehicles, and more specifically to towing apparatuses comprising lifting means for temporarily lifting the vehicle and support means for supporting the vehicle while in transit to a repair station.

Towing apparatuses of this type are required particularly for large vehicles such as trucks or buses which in the event of a locked axle or flat tire cannot immediately be repaired at an accident site or loaded onto larger vehicles to be transported away. Towing is also not immediately possible in the case of tire defects or locked axles. Nevertheless, the accident site must be cleared as quickly as possible in order to avoid unnecessarily obstructing traffic. The vehicle must be conveyed to a place where it can be repaired, or at least prepared for transport over some distance.

German Offenlegungsschrift No. 2,841,215 discloses a towing apparatus including a lifting device similar to a winch or a jack. This reference contains specific disclosures only with respect to the attachment means between the winch and the wheel of the vehicle to be lifted. A shaft stub is screwed to the vehicle wheel on the outside coaxially to the wheel axle by the use of wheel nuts. The lifting device can be positioned beneath the protruding shaft stub and the vehicle wheel can be raised. A mobile wheel support for which no detailed disclosure is presented is provided for emergency movement. Although only every other wheel nut has to be removed and repositioned in order to screw on the flange for the purpose of fastening the shaft stub, the assembly of the shaft stub is relatively time-consuming. Furthermore the shaft stub extends relatively far laterally, so that space required in the transverse direction for raising the vehicle wheel is relatively great. Space is seemingly also required on both sides of the raised wheel in order to slide the mobile wheel support under the raised wheel. In normal road traffic, adequate space for use of this apparatus may generally be available. In contrast, where service is required for vehicles on roads with lateral transverse guide rails and transverse guide rollers arranged on the vehicles, the space conditions in the wheel region are greatly constricted by the transverse guide rails. This space problem makes it virtually impossible to use prior art towing apparatuses. It must be considered in this context that the clearance afforded vehicles suitable for rail-bound use is relatively narrow, which is a principal advantage of such rail-bound vehicles. This clearance must not or cannot be diminished when applying the towing apparatus either because of a need to avoid obstructing oncoming traffic in a closely adjacent track, or because a tunnel wall or some other obstacle restricting the clearance is already present in immediate proximity. Additionally, the transverse guide rail itself is frequently incapable of supporting a load in the vertical direction, so that the lifting device cannot be supported upon the upper face of this rail. It must also be taken into consideration that the wheel to be raised occupies highly variable positions relative to the transverse guide rail. The wheel may come to a standstill in immediate proximity to the transverse guide rail, or relatively far from the rail.

One object of the invention is to provide an improved towing apparatus while avoiding the disadvantages and satisfying the requirements described above. The apparatus must be capable of use with vehicles adapted for rail-bound service and suitable for service on tracks with lateral transverse guide means arranged on the vehicles.

This object and other objects of the invention are achieved according to the present invention by provision of the following apparatus. A lifting device is provided which is braced through the intermediary of a cross-bar with angular feet against the wheel tread of the vehicle to be raised. The lifting device is located in direct proximity to the vehicle wheel to be raised, so that the width required is extremely small. Furthermore the lifting device can immediately be employed regardless of the proximity of the transverse guide rail to the wheel. Additionally, any vertical loading of the transverse guide rail by the lifting device is avoided. Operation of the device is immediately possible even in constricted surroundings. An emergency truck comprising a mobile support means having a narrow construction provides mobile support for the vehicle. This support means can always be pushed past the stationary lift supports in a longitudinal direction relative to the vehicle and brought into position in spite of the bracing of the angular supports on the wheel tread of the vehicle wheels. The supporting surface of the emergency truck is also always at the same height regardless of any possible tire defects.

Further objects, features, and advantages of the present invention will become more apparent from the following description when taken with the accompanying drawings which show, for purposes of illustration only, embodiments in accordance with the present invention.

DETAILED DESCRIPTION OF THE DRAWINGS

Figure 2:
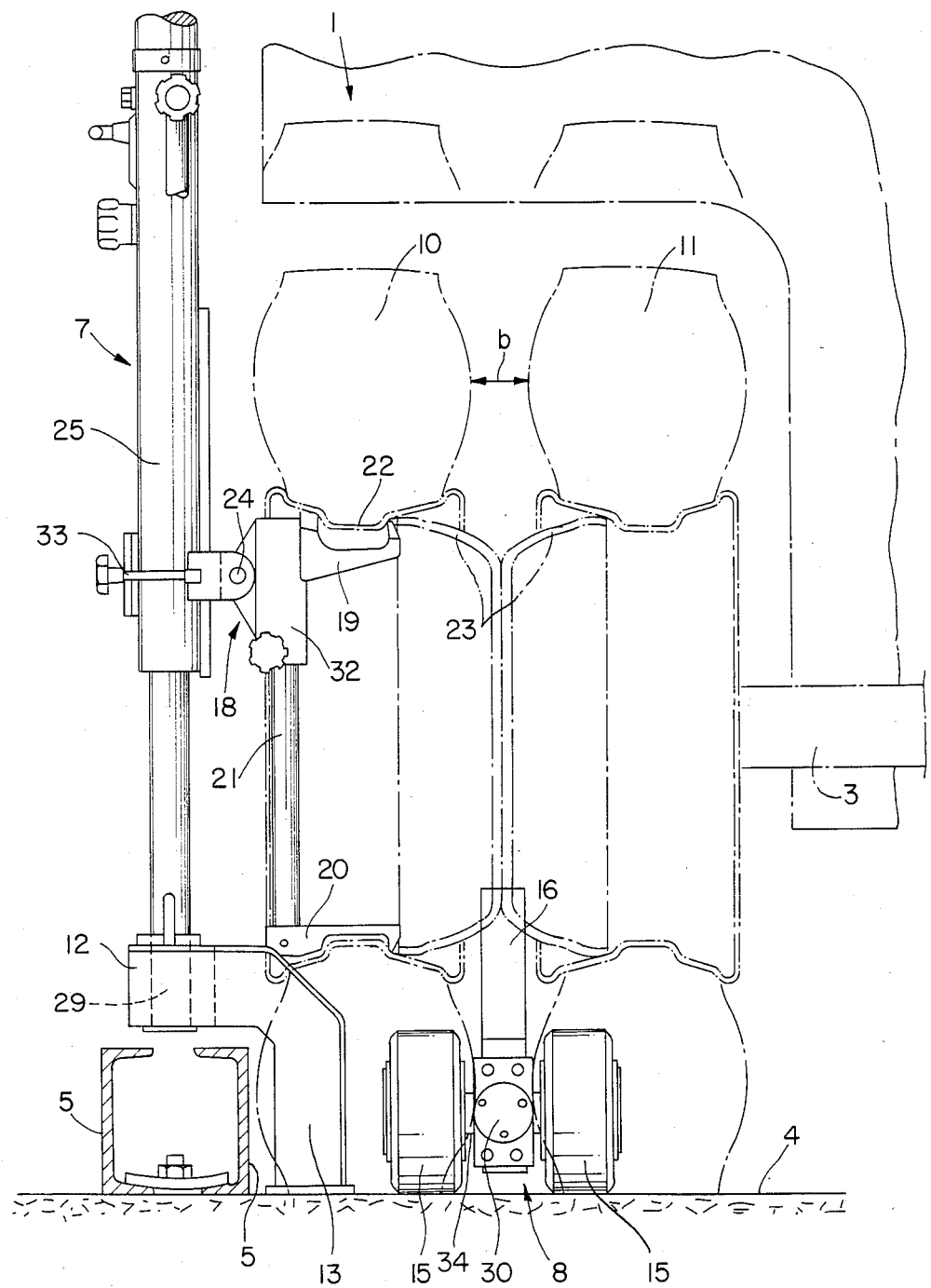
FIG. 2 shows a front view of a lifting device and mobile support means in accordance with the present invention during use on a twin wheel axle.
Figure 3:
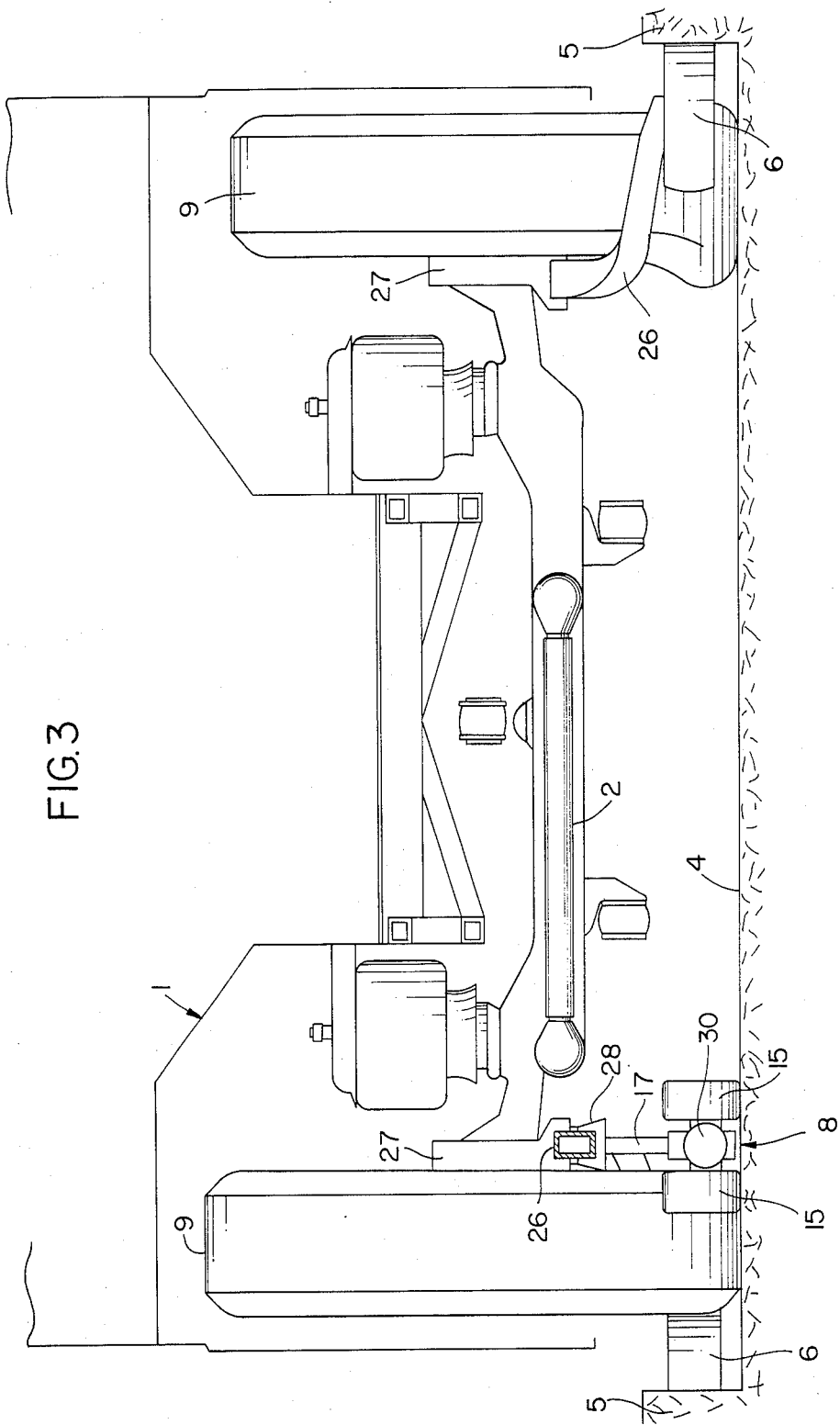
FIG. 3 shows a front view of a mobile support means in accordance with the present invention on a steerable vehicle axle on a vehicle for rail-bound use.

The vehicle 1 indicated in FIGS. 2 and 3 travels on a road 4 which is bounded on both sides by transverse guide rails 5. Tranverse guide rollers 6, mounted on the vehicle through intermediary brackets 26 in constant relative position to the plane of the vehicle wheels, cooperate with the transverse guide rails 5 and maintain the vehicle in a definite transverse position relative to the road 4. In this manner, the vehicle can be guided on the rail-lined road without a driver. As indicated in FIG. 2, a second rail can be positioned at a very close lateral spacing from the first rail because the separation requirement for adjacent vehicles is very small due to rail guidance. This close vehicle spacing, or tunnel walls, etc. located at a small lateral spacing, restricts very greatly the space requirements for attaching a towing apparatus. Additionally, transverse guide rail consisting of rolled profiles as shown in FIG. 2, are not loadable in the vertical direction at all points with the weight of a vehicle. Accordingly, the transverse guide bars are unavailable for the purpose of supporting a lifting device when using a towing apparatus.

The towing apparatus of the present invention comprises a lifting device 7 and an emergency mobile support means 8. The stationary lifting device serves solely to raise the vehicle wheel and is required only temporarily, whereas the actual towing operation is performed with the mobile support means. The lifting device is removed after the support means is properly positioned.

The invention will first of all be discussed with reference to application on a twin wheel axle 3 (generally the driven rear axle of such vehicles) having an outer wheel 10 and an inner wheel 11. The twin wheel axle thus differs from a steerable axle 2 (as shown in FIG. 3) which has a single vehicle wheel 9 on each vehicle side and is arranged on the front of the vehicle. Additionally, the wheel dish 23 of the outer wheel 10 on the twin wheel axle 3 points outward with its flared side, whereas the wheel dish of the wheel 9 on the steered vehicle axle 2 has its flared side pointing inward and the closed side of the wheel dish pointing outward. This difference is critical for the fitting of the attachment means of the lifting device to the vehicle wheels. Further details of the attachment means will be given below.

To permit the lifting device to be supported safely on the ground irrespectively of the particular relative position existing between vehicle wheel and transverse guide rail 5, and irrespectively of the respective constructions of the transverse guide rail the lifting device is attached to a cross-bar 12 in a manner which avoids buckling. The cross-bar is located at a level above the transverse guide bar and extends in a longitudinal direction relative to the vehicle. The cross-bar 12 is braced in turn through intermediary angular supports 13 placed upon the road 4 in the region of the wheel tread of the vehicle to be lifted. More specifically, the angular supports are positioned in front of and behind the vehicle wheel. The supports 13, as seen in FIG. 2, are constructed angularly so that they extend contactlessly around the transverse guide rail 5 and divert the bracing force from the cross-bar into the road 4. The cross-bar 12 has a length which corresponds approximately to the diameter of the vehicle wheel, so that it can be braced on the ground in front of and behind the vehicle wheel, even if the tire is greatly deformed due to a "flat" and the rim is in a particularly low position. Due to this long configuration of the cross-bar, the lifting device can be extremely heavy and bulky, at least in the state of readiness for service. To enable it to be handled easily, the cross-bar is detachable from the lifting device 7 and is a separate part. Only a jacking part 25 of the lifting device remains after the removal of the cross-bar with its angular feet. This lifting device can be joined to the cross-bar 12 so as to resist buckling through the use of a plug-in connection 29. This plug-in connection 29, which permits pivotal movements of the jacking part 25 of the lifting device 7 about its vertical axis, compensates for slight pivotal movements about a vertical axis by the vehicle axle to be raised.

The jacking part 25 of the lifting device 7 can be constructed in numerous ways, well known in the prior art. It is conveniently a hydraulic hoisting apparatus, in which oil pressure, which can be generated by a small hand lever, lifts the lifting device through the intermediary of a piston.

An attachment means 18 for coupling the jacking part 25 to the vehicle wheel to be lifted is adjustably clamped by means of clamping apparatus 33 in the desired vertical position to the outside of the jacking part 25 of the lifting device. This clamping apparatus may be supported by a positive connection in the form of a toothed bar or a row of holes and corresponding bolts. The adjustable vertical alignment is necessary in order to adapt to different wheel diameters and/or to different initial positions of the axle height of a broken-down vehicle.

The vehicle axle ordinarily executes a slight pivotal movement when lifted at one side due to the tilting of the axle about the standing edge on the opposite vehicle wheel. In order to avoid distortions and in order to compensate for the tilting, pivotal movement is provided between the attachment means 18 and the winch part 25 of the lifting device. This is provided in the form of a horizontal longitudinal shaft 24 about which attachment means 18 is rotatable.

The attachment means 18 for a twin wheel axle 3, that is to say for a vehicle wheel with a wheel dish 23 opening outward, engages the well-base groove 22 of the wheel rim. A pair of hooks arranged in mirror-image relationship, i.e., upper hook 19 and lower hook 20, are adapted to the cross-sectional contour of the well-base groove 22 and engage the wheel around the groove over a width which corresponds at least approximately to the width of the well-base groove itself. Particularly the upper hook 19, which has to absorb the entire wheel load, has a particularly wide contact with the well-base groove. The two hooks 19 and 20 are adjustable in their mutual separation and the separation is fixable by means of a clamping means 32 on vertically aligned guide means 21 formed by a pair of guide columns. Due to the mutual sliding separation of the two hooks, they can be applied reliably to the rim and engage behind the well-base groove. The sliding separation also permits easy adaptation to different rim diameters. The fitting of the attachment means 18 with the mobile hooks to the well-base groove can proceed in a much shorter time than attaching of an axle stub to wheel nuts. It must particularly be borne in mind that in the case of a "flat", the lower wheel nuts are not easily accessible or accessible at all with a cross spanner due to the upstanding transverse guide rail 5.

By means of two opposing hooks engaged positively in the well-base groove, the attachment means 18 is maintained in a constant position relative to the wheel plane irrespectively of the lifting forces applied to the shaft 24 which is offset relative to the well-base groove 22. This is necessary in order to prevent skewing of the hooks and in order to prevent indentations on the rim caused during raising of the vehicle wheel. The attachment means 18 in the construction shown in FIGS. 1 and 2, with diametrically opposite clamping in the rim dish, is also lighter in construction than a hook contacting the rim on only one side which would have to be very heavy due to its relatively great cantilever length. Only the lower hook 20 is slidable on the guide means 21; the upper hook 19, which is substantially more heavily loaded during lifting, is not slidable on the guide means. It is connected rigidly to the corresponding part of the shaft 24. The columns for the guide means 21 are slidable and clampable in part of the upper hook 19. The lower hook 20 is only required to absorb the tilting moments and prevent the attachment means 18 from pivoting out of the rim dish. The attachment means 18 can be fitted to the rim relatively quickly by sliding the lower hook and tightening the clamping means 32. In a similar manner it may be quickly disengaged after lowering the raised wheel onto the emergency mobile support means 8.

Figure 1:
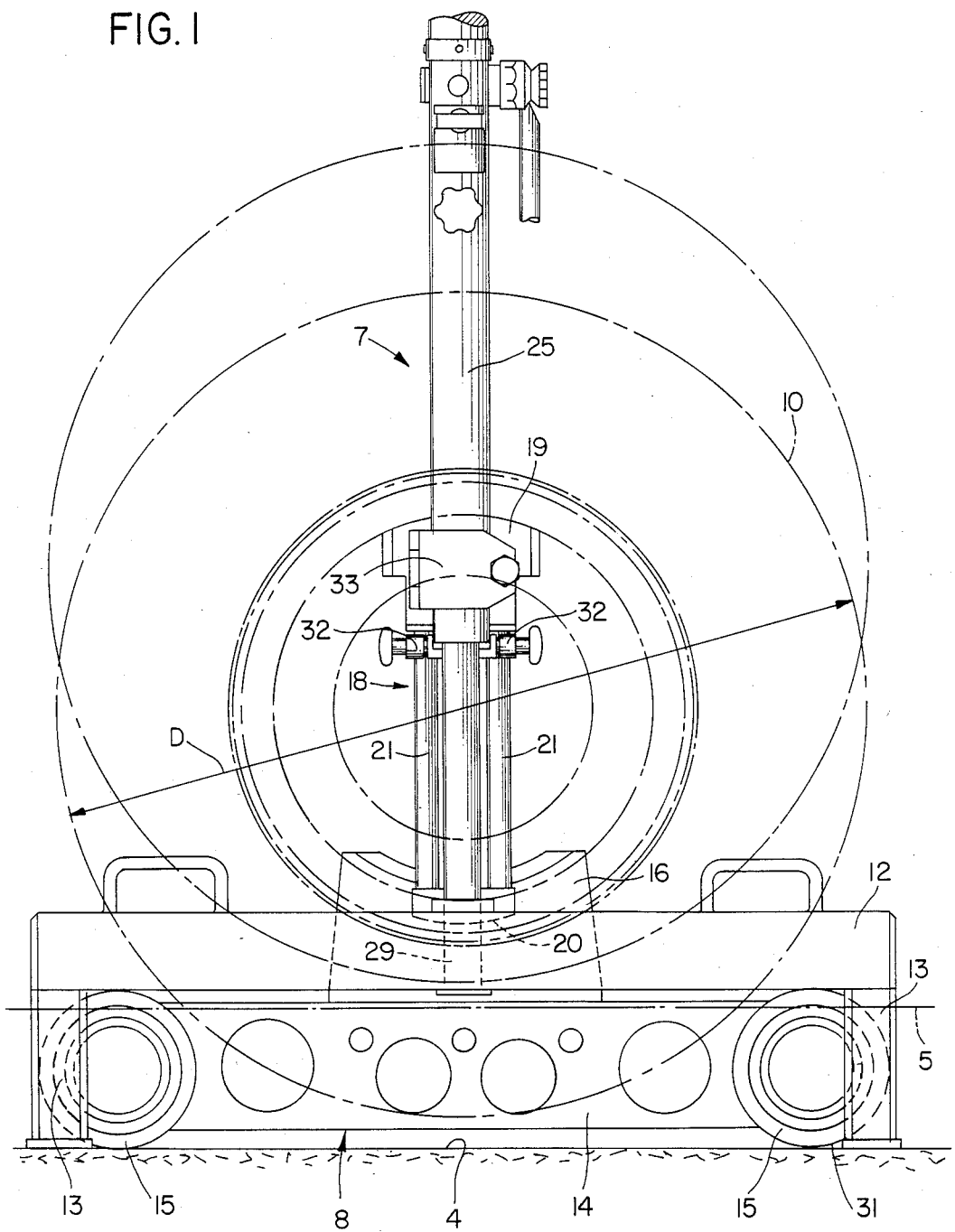
FIG. 1 shows a side view of the lifting device and the mobile support means according to the present invention.

The mobile support means 8 is of especially narrow construction, so that, despite the bracing of the cross-bar 12 with the angular supports 13 on the wheel tread of the wheel to be raised, it can be slid past the supports 13 beneath the vehicle wheel in the longitudinal direction of the vehicle. There is no accessibility from the side due to the transverse guide rail 5 and due to the immediate proximity of the cross-bar 12 to the vehicle wheel. As can be seen in FIGS. 1 and 2, the emergency mobile support means 8 comprises a narrow bridge 14 oriented in the longitudinal direction of the vehicle. The bridge has at each of its two ends two rollers 15 which are arranged respectively to right and left of the bridge 14. The bridge 14 has a length that corresponds approximately to the diameter D of the vehicle wheels. The roller pairs at each end of bridge 14 are thus separated so far that they remain outside the circumferential contour of the vehicle wheel when the latter is completely lowered. The bridge itself is made so narrow that its thickness corresponds approximately to the clearance b between the two adjacent tires 10 and 11 and can project in between these tires. A seat mounting can be fastened detachably, but resistantly to torsion and buckling, to the upper side of the bridge. In the case of the specific application for twin wheel axles the seat mounting 16 is braced against the rim dishes 23 of the two wheels. It is constructed as a narrow plate which projects in between the tires 10 and 11 to the outside of the two wheel dishes 23 at a point where the dishes mutually abut. The wheel dishes together form a V-shaped circumferential groove at the point where they meet. The plate has an arcuate concave contour on its upper side and is of wedge-shaped cross-sectional configuration in the region of the curvature. The curvature is adapted to the V-shaped groove both in the circumferential direction and also in cross-sectional shape. Due to these facts the bar wraps round the V-shaped groove over approximately 75° to 100° in the contact region. This results in positive location of the emergency support means in the longitudinal direction and also in the transverse direction, thereby stabilizing the support means against lateral offset. By virtue of supporting the rims upon the emergency truck, the vehicle wheel is supported at a constant height above the road irrespectively of any tire defect.

In order to give the rollers 15 of the emergency support means contact with the road over the widest possible surface to lessen the effect of road irregularities, each roller pair is mounted on a common axle 34 which is in turn pivotable about an axis located parallel to the longitudinal axis of the bridge 14 through the intermediary of a pivot bearing 30. It is thereby possible for the wide rollers to adapt themselves to road irregularities. In order to reduce the rolling noise the rollers are provided on their circumference with a resilient covering 31, which is made from an elastomeric material such as polyurethane elastomer which exhibits superior wear characteristics. A suitable material is that known under the registered trademark "Vulkolan".

When the mobile support means is used on a steered vehicle axle 2 (see FIG. 3) the corresponding seat mounting 17 for such an axle should be selected. In the case of a steered vehicle axle with individual vehicle wheels 9 for each vehicle side the wheel dish is placed with the closed side outwards. The attachment means must accordingly be differently shaped than as shown in FIGS. 1 and 2. It will scarcely be possible in this case to avoid the prior art attachment devices discussed above., i.e., to fasten an axle stub, a hooking eye, etc. to the wheel through attachment to at least some of the wheel nuts. The greater time outlay for fastening such an attachment means is more readily justifiable for this specific application, because locked wheels occur extremely rarely during use of non-driven steered vehicle axles. In the case of a tire defect, the vehicle can be driven out of the rail guidance line, and the road cleared, by the vehicle's own power without a towing device by virtue of an emergency wheel fitted inside the tire. The towing apparatus is therefore required only extremely rarely for the front axle.

The construction of the steerable axle in the region of possible seating is as follows. The transverse guide rollers 6 are mounted through the intermediary of a swung retaining arm which extends around the vehicle wheel from the inside and participates in the lock arrangement of the steerable vehicle wheel. A bracket 26 of rectangular cross-section, which is fastened to the underside of the pivotable axle stub 27, is aligned in the longitudinal direction of the vehicle in the fastening region. This bracket presents a good seating location for the corresponding seat mounting 17. In fact, seat mounting 17 comprises a U-shaped profile 28 enveloping the bracket 26 underneath with slight play. The profile 28 is mounted at a vertical spacing from the bridge 14 of the emergency truck 8. By this positive seating on the axle stub, here again the mobile support means is aligned reliably in the longitudinal and transverse directions relative to the corresponding vehicle wheel 9. The mobile support means participates also during towing service in the lock arrangement of the vehicle wheel 9 which is imposed upon it by the transverse guide rail 5 through the intermediary of the transverse guide rollers 6. Furthermore, due to positive engagement of the bracket 26, it is also impossible for the mobile support means to drift laterally, for example, towards the center of the vehicle.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A towing apparatus for a vehicle having wheels guided between a pair of parallel rails comprising:
   mobile support means for supporting hub means of said vehicle during a towing operation;
   said mobile support means comprising narrow elongate bridge means extending parallel to a towing direction during said towing operation, seat mounting means attached to said bridge means for positively abutting said hub means, and first roller means rotatably mounted at a forward end of said bridge means and second roller means rotatably mounted at a rearward end of said bridge means for enabling said mobile support means to move along a surface with said vehicle during said towing operation, said seat mounting means interposed between said first and second roller means,
   stationary lifting means for temporarily lifting said vehicle to allow said mobile support means to be positioned under said vehicle hub means, said stationary lift means being removable after positioning said mobile support means and prior to said towing operation;

said stationary lifting means comprising horizontal cross bar means, vertically disposed angular support means attached to each end of said cross bar for supporting said cross bar adjacent one of said wheels and above one rail of said pair of rails in a non-contact relationship with said one rail, jacking means disposed on said cross bar for lifting said vehicle, and attachment means for attaching said jacking means to said vehicle.

2. A towing apparatus according to claim 1, wherein said attachment means is pivotably attached to said jacking means, said attachment means comprising vertically disposed guide means, a pair of relatively displaceable hook means disposed on said guide means for engaging said hub means of one of said wheels at two diametrically opposed points on a peripheral portion of said hub means, said diametrically opposed points contained in a vertical plane.

3. A towing apparatus according to claim 2, wherein said pivot axis extends through one hook means of said pair of hook means and wherein another hook means of said pair of hook means is displaceable relative to said pivot axis.

4. A towing apparatus according to claim 1, wherein said seat mounting means comprises contoured bar means complementary to a contour of a portion of said hub means, said bar means being engageable with said portion during said towing operation.

5. A towing apparatus according to claim 4, wherein said contoured bar means has a concave arcuate contour.

6. A towing apparatus according to claim 5, wherein said contoured bar means is adapted to fit into a V-shaped groove in said hub means.

7. A towing apparatus according to claim 4, wherein said seat mounting means comprises bar means engageable with longitudinally extending bracket means of said hub means.

8. A towing apparatus according to claim 1, wherein said jacking means is detachably disposed on said cross bar means.

9. A towing apparatus according to claim 1, wherein at least one of said first and second roller means comprises a pair of rollers mounted on a common axle, said axle being pivotably disposed about a longitudinal axis of said elongate bridge means.

10. A towing apparatus according to claim 1, wherein at least one of said first and second roller means comprise an elastomeric polymer.

11. A towing apparatus according to claim 10, wherein said elastomeric polymer is a polyurethane elastomer.

12. A towing apparatus according to claim 1, wherein each of said first and second roller means comprises a pair of rollers on a common axle, said axle being pivotally disposed about a longitudinal axis of said elongate bridge means.

13. A towing apparatus according to claim 1, wherein each of said first and second roller means comprise an elastomeric polymer.

* * * * *